United States Patent [19]

Kajikawa et al.

[11] 4,373,907
[45] Feb. 15, 1983

[54] APPARATUS FOR MANUFACTURING RAPIDLY COOLED SOLIDIFIED SLAG

[75] Inventors: Shuji Kajikawa; Kazuo Kanai; Haruo Ito, all of Fukuyama, Japan

[73] Assignee: Nippon Kokan Kabushiki Kaisha, Tokyo, Japan

[21] Appl. No.: 268,074

[22] Filed: May 27, 1981

[30] Foreign Application Priority Data

Jun. 13, 1980 [JP] Japan ................................. 55-79977

[51] Int. Cl.³ .................. F27D 15/02; F27D 3/00; C21B 3/06
[52] U.S. Cl. ..................................... 432/83; 266/201; 432/236
[58] Field of Search .................. 432/70, 77, 83, 90, 432/91, 236; 110/165 R; 266/201

[56] References Cited

U.S. PATENT DOCUMENTS 1,634,858  7/1927  Stoop .................................. 432/236
4,050,884  9/1977  Jablin .................................. 432/29

FOREIGN PATENT DOCUMENTS 2333854  1/1975  Fed. Rep. of Germany ...... 432/236

Primary Examiner—John J. Camby
Attorney, Agent, or Firm—Frishauf, Holtz, Goodman and Woodward

[57] ABSTRACT

An improved apparatus for manufacturing a rapidly cooled solidified slag, the improvement relating to the use of pairs of weirs having an annular shape and a hollow portion therein; each of said pair of weirs being fixed to each edge of the peripheral surface of one of a pair of cooling drums so as to form a circular flange at right angles to the axial line of the one cooling drum around the entire circumference thereof.

6 Claims, 5 Drawing Figures

APPARATUS FOR MANUFACTURING RAPIDLY COOLED SOLIDIFIED SLAG

FIELD OF THE INVENTION

The present invention relates to an apparatus for manufacturing a rapidly cooled solidified slag, which permits a high cooling rate sufficient to convert a molten slag into a rapidly cooled solidified slag particularly adapted to serve as a cement material.

BACKGROUND OF THE INVENTION

Molten slags include, for example, molten blast furnace slag, molten converter slag, and molten electric furnace slag. It has been known that it is possible to obtain a rapidly cooled solidified slag by cooling a molten slag at a high cooling rate for solidification.

As an apparatus for obtaining a rapidly cooled solidified slag by rapidly cooling and solidifying a molten slag as mentioned above, the following apparatus for manufacturing a rapidly cooled solidified slag is known.

FIG. 1 shows the apparatus for manufacturing a rapidly cooled solidified slag, which is substantially the same as the apparatus for manufacturing a rapidly cooled solidified slag disclosed in the U.S. Pat. No. 4,050,884 dated Sept. 27, 1977. The above-mentioned conventional apparatus for manufacturing a rapidly cooled solidified slag is described below with reference to FIG. 1.

In FIG. 1, the housing 1 is an enclosed-structure having an opening 1a at the top thereof for passing a molten slag, and a discharge port 1b at the lower end thereof, for discharging a crushed rapidly cooled solidified slag 7'. In the housing 1, a pair of cooling drums 2 each having the same diameter and the same length are arranged so that the axial directions thereof are parallel to each other in the same horizontal plane and the peripheral surfaces thereof are in contact with each other. Each of the pair of cooling drums 2 is rotated by a suitable driving means (not shown) in directions opposite to each other at the same peripheral speed as shown by the arrows "a" and "a'" in FIG. 1, in the rising direction of the peripheral surface of each of the pair of cooling drums 2 at the contact portion thereof. A plurality of cooling through-holes (not shown) are pierced in the peripheral wall of each of the pair of cooling drums 2 in the axial direction thereof. One end of each of the plurality of cooling through-holes communicates with a hollow portion (not shown) of one end of the center axle of the cooling drum 2, and the other end of the cooling through-holes communicates with a hollow portion (not shown) of the other end of the center axle of the cooling drum 2. The hollow portion of the above-mentioned one end of the center axle of the cooling drum 2 is liquid-tightly connected to one end of a pipe 3 through a swivel joint (not shown). The other end of the pipe 3 is connected to the inlet of a heat exchanger 4 through another swivel joint (not shown). An end of another pipe 5 is provided with a pump 6 on the way is connected to the outlet of the heat exchanger 4. The other end of the pipe 5 is liquid-tightly connected to one of the hollow portion of the center axle of the cooling drum 2 through a swivel joint (not shown). In FIG. 1, one heat exchanger 4 is shown to be connected to one of the cooling drums 2, however another heat exchanger (not shown) is also connected to the other cooling drum 2 in the same way as mentioned above. Therefore, cooling water for cooling the cooling drum 2 is supplied to the plurality of cooling through-holes of the peripheral wall of the cooling drum 2 through the pipe 5 and the center axle of the cooling drum 2 by means of the pump 6. The cooling water supplied to the plurality of cooling through-holes is heated as described later by means of the heat contained in the molten slag 7 which is adhered to the peripheral surface of the cooling drum 2, and supplied to the heat exchanger 4 through the center axle of the cooling drums 2 and the pipe 3 while partially generating steam. The pressurized steam supplied to the heat exchanger 4 is subjected to heat exchange in the heat exchanger 4 to become a cooling water which is supplied again to the plurality of cooling through-holes of the peripheral wall of the cooling drum 2 by means of the pump 6. Thus, the cooling water circulates through the cooling drum 2 and the heat exchanger 4. On the other hand, the high-pressure steam obtained through heat exchange with the pressurized steam in the heat exchanger 4 drives a turbine 8 which in turn drives an electric power generator 9. The high-pressure steam is cooled by a condenser 10 which is provided in the turbine 9, and thereafter supplied again in liquid state to the heat exchanger 4 by means of a pump 11. Cooling water is supplied in circulation to the condenser 10 from a cooling tower 12 by a pump 13.

A pair of weirs 14 are provided in the upper halves of the both ends of each of the pair of cooling drums 2 so as to be in contact with the both ends of each of the pair of cooling drums 2. In FIG. 1, one of the pair of weirs 14 is shown. The pair of weirs 14 are supported on the housing 1 by means of a suitable supporting means (not shown). A slag sump 15 is formed by the peripheral surface of each of the pair of cooling drums 2 and the pair of weirs 14. The molten slag 7 discharged from the slag runner 16 is poured, through the opening 1a of the housing 1, into the slag sump 15 where a slag pool is formed. The molten slag 7 poured into the slag sump 15 adheres to the peripheral surfaces of the cooling drums during rotation, rapidly cooled and solidified into a rapidly cooled solidified slag. The cooling water supplied to the plurality of cooling through-holes of the peripheral wall of the cooling drum 2 is heated by the molten slag 7 deposited on the peripheral surface of the cooling drum 2 to become a pressurized steam. When the rapidly cooled solidified slag 7' reaches the lower half of the cooling drum 2 along with the rotation of the cooling drum 2, the rapidly cooled solidified slag 7' adhering to the peripheral surface of the cooling drum 2 is peeled off therefrom, while being crushed by a scraper 17 supported on the housing 1 by means of a suitable supporting means (not shown), and drops into the lower part of the housing 1. An opening and closing means (not shown) is provided in the discharge port 1b of the lower part of the housing 1. The peripheral surface of the cooling drum 2 from which the rapidly cooled solidified slag 7' has been peeled off by the scraper 17 comes again into contact with the molten slag 7 of the slag sump 15 along with the rotation of the cooling drum 2, whereby a rapidly cooled solidified slag is continuously manufactured.

According to the above-mentioned apparatus for manufacturing a rapidly cooled solidified slag by using the cooling drum, it is possible to continuously manufacture a rapidly cooled solidified slag, and to recover the heat at a high temperature gained by the cooling drums through the heat exchange with the molten slag.

However, the above-mentioned apparatus for manufacturing a rapidly cooled solidified slag has the following problems. Being always in contact with the both ends of each of the pair of cooling drums 2, the pair of weirs 14 are also cooled. When a molten slag 7 comes into contact with the pair of weirs 14, therefore, the molten slag 7 adheres to the surface of each of the pair of weirs 14, resulting in formation of a solidified slag thereon. Formation of the solidified slag on the slag pool causes decrease in the slag pool temperature and further growth of the solidified slag. As a result, smooth rotation of each of the pair of cooling drums 2 is impaired, and this finally leads to stoppage of the rotation thereof. Also, due to the difference in thermal expansion between the pair of weirs 14 and the pair of cooling drums 2, the contact resistance between the pair of weirs 14 and the pair of cooling drums 2 increases, and this impairs smooth rotation of each of the pair of cooling drums 2.

SUMMARY OF THE INVENTION

A principal object of the present invention is therefore to provide an apparatus for manufacturing a rapidly cooled solidified slag, which permits achievement of a high cooling rate sufficient to convert a molten slag into a rapidly cooled solidified slag.

Another object of the present invention is to provide an apparatus for manufacturing a rapidly cooled solidified slag, which permits effective recovery of high-temperature heat contained in a molten slag.

A further another object of the present invention is to provide an apparatus for manufacturing a rapidly cooled solidified slag, which permits prevention of formation of a solidified slag in a slag pool.

In accordance with one of the features of the present invention, there is provided an apparatus for manufacturing a rapidly cooled solidified slag, which comprises: a pair of cooling drums each having the same diameter and the same length, the axial lines of said pair of cooling drums being arranged in parallel with each other in the same horizontal plane, the peripheral surfaces of said pair of cooling drums being contact with each other; a driving means for rotating said pair of cooling drums, said driving means being adapted to rotate said pair of cooling drums in directions opposite to each other at the same peripheral speed in the rising direction of the peripheral surface of each of said pair of cooling drums at the contact portion of said pair of weirs provided at the both ends of said pair of cooling drums, said pair of weirs forming a slag sump in cooperation with the upper half of the peripheral surface of each of said pair of cooling drums; a slag feeding means arranged above said pair of cooling means, for pouring a molten slag into said slag sump; a scraper provided so as to be in contact with the lower half of the peripheral surface of each said pair of cooling drums; a cooling water for cooling said pair of cooling drums, said cooling water being supplied into each of said pair of cooling drums through the center axle of each of said pair of cooling drums, said cooling water exchanging heat with said molten slag in said slag sump, which has adhered to the peripheral surface of each of said pair of cooling drums, along with the rotation of each of said pair of cooling drums, and, said cooling water which has exchanged heat with said molten slag being discharged through said center axle of each of said pair of cooling drums for heat recovery, whereby said molten slag adheres to the peripheral surfaces of said pair of cooling drums is converted into a rapidly cooled solidified slag through heat exchange with said cooling water and is then peeled off from the peripheral surfaces of said pair of cooling drums by means of said scraper, along with the rotation of said pair of cooling drums; said apparatus being characterized in that: each of said pair of weirs has an annular shape and has a hollow portion therein, and, each of said pair of weirs being fixed to each edge of the peripheral surface of one of said pair of cooling drums so as to form a circular flange at right angles to the axial line of said one cooling drum over the entire circumference thereof.

DETAILED DESCRIPTION OF PREFERRED EMBODIMENTS

Figure 1:
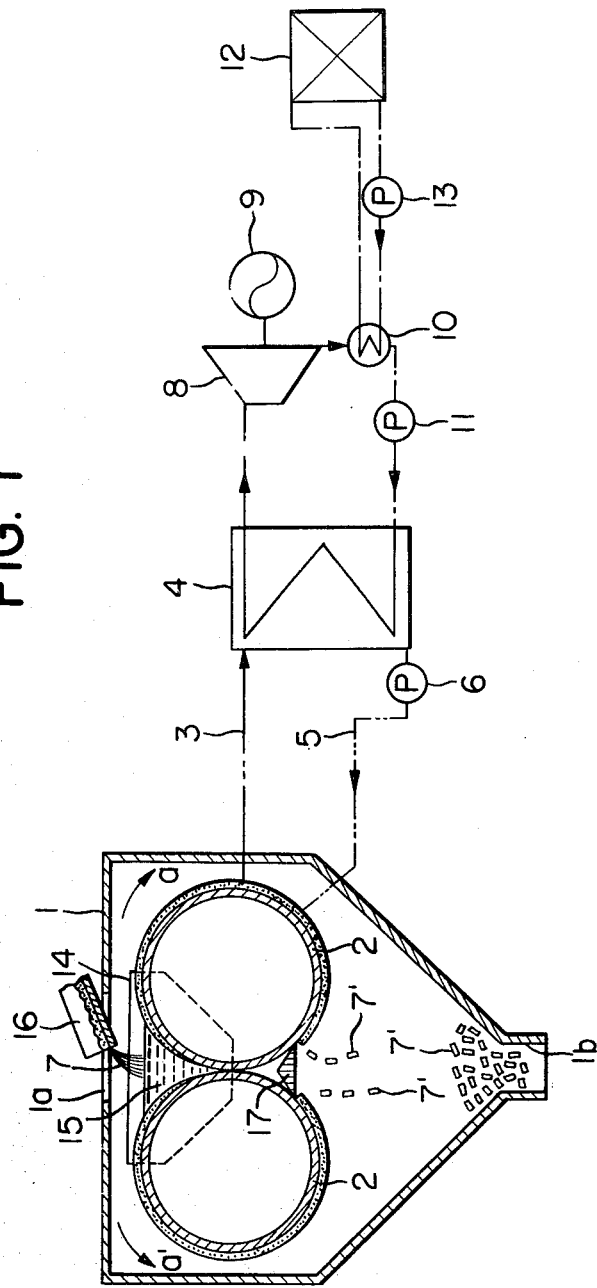
FIG. 1 is a schematic sectional view showing an embodiment of the conventional apparatus for manufacturing a rapidly cooled solidified slag.

With a view to solving the above-mentioned problems involved in the conventional apparatus using a pair of cooling drums for manufacturing a rapidly cooled solidified slag, we carried out extensive studies. As a result, we obtained the following findings:

A solidified slag adheres to the pair of weirs because the same molten slag is in contact with the pair of weirs for a long period of time. By constantly moving the pair of weirs, therefore, the pair of weirs become always in contact with a fresh molten slag, and it is thus possible to prevent the solidified slag from adhering to the pair of weirs.

The present invention was made on the basis of the above-mentioned finding, and the apparatus for manufacturing a rapidly cooled solidified slag of the present invention comprises:

a pair of cooling drums each having the same diameter and the same length, the axial lines of the pair of cooling drums being arranged in parallel with each other in the same horizontal plane, the peripheral surfaces of the pair of cooling drums being in contact with each other; a driving means for rotating the pair of cooling drums, the driving means being adapted to rotate the pair of cooling drums in directions opposite to each other at the same peripheral speed in the rising direction of the peripheral surface of each of the pair of cooling drums at the contact portion of the pair of cooling drums; a pair of weirs provided at the both ends of the pair of cooling drums, the pair of weirs forming a slag sump in cooperation with the upper half of the peripheral surface of each of the pair of cooling drums; a slag feeding means arranged above the pair of cooling drums, for pouring a molten slag into the slag sump; a scraper provided so as to be in contact with the lower half of the peripheral surface of each of the pair of cooling drums; a cooling water for cooling the pair of cooling drums, the cooling water being supplied into each of the pair of cooling drums through the center axle of each of the pair of cooling drums, the cooling water exchanging heat with the molten slag in the slag sump, which has adhered to the peripheral surface of each of the pair of cooling drums, along with the rotation of each of the pair of cooling drums, and, the cooling water which has exchanged heat with the molten slag being discharged through the center axle of each of the pair of cooling drums for heat recovery, whereby the molten slag adhering to the peripheral surfaces of the pair of cooling drums is converted into a rapidly cooled solidified slag through heat exchange with the cooling water and is then peeled off from the peripheral surfaces of the pair of cooling drums by means of the scraper, along with the rotation of the pair of cooling drums; the apparatus being characterized in that: each of the pair of weirs has an annular shape and has a hollow portion therein, and, each of the pair of weirs being fixed to each edge of the peripheral surface of one of the pair of cooling drums so as to form a circular flange at right angles to the axial line of the one cooling drum over the entire circumference thereof.

Now, an embodiment of the apparatus for manufacturing a rapidly cooled solidified slag of the present invention is described with reference to the drawings.

Figure 2:
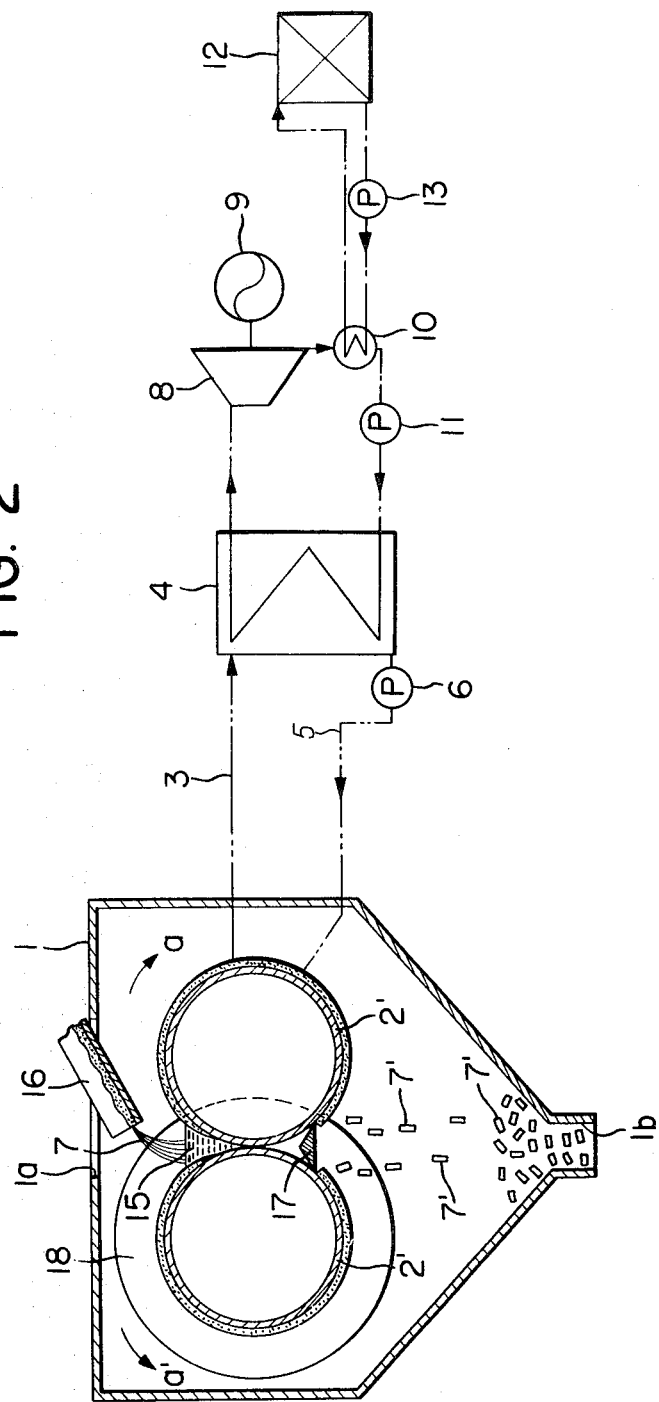
FIG. 2 is a schematic sectional view showing an embodiment of the apparatus for manufacturing a rapidly cooled solidified slag of the present invention.
Figure 3:
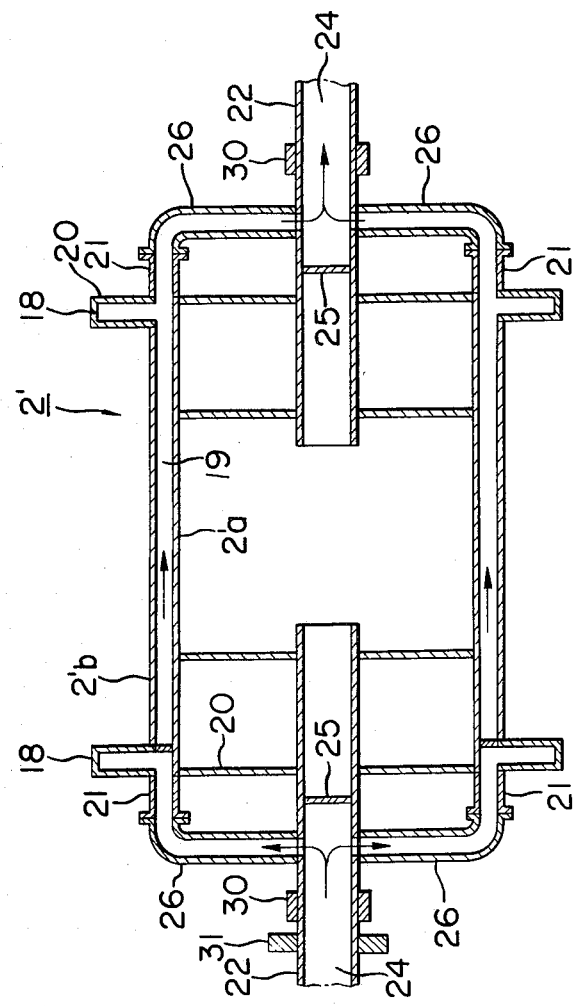
FIG. 3 is a longitudinal sectional view of one of the pair of cooling drums, which has a pair of weirs of the present invention.
Figure 4:
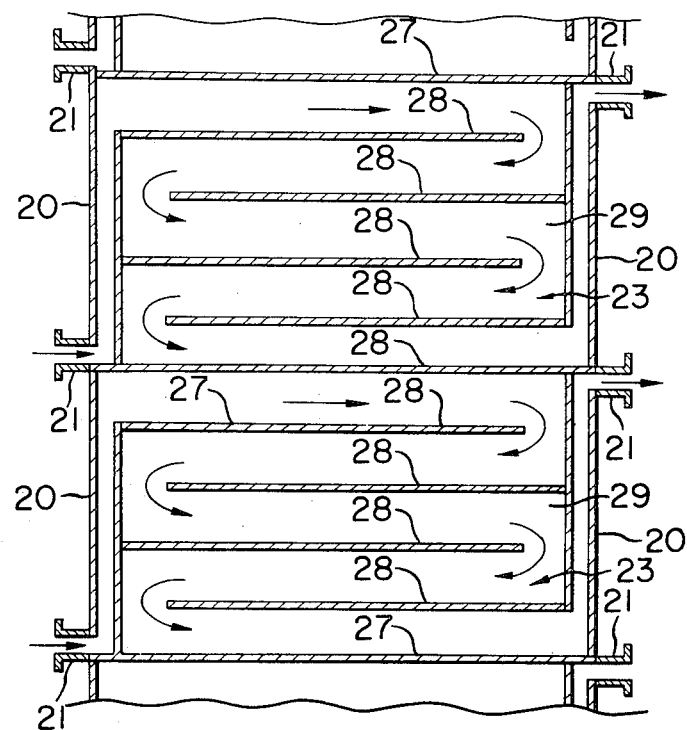
FIG. 4 is a development view of a part of one of the pair of cooling drums, which has a pair of weirs of the present invention; and, FIG. 5 is a perspective view of a part of one of the pair of cooling drums, which has a pair of weirs of the present invention.
Figure 5:
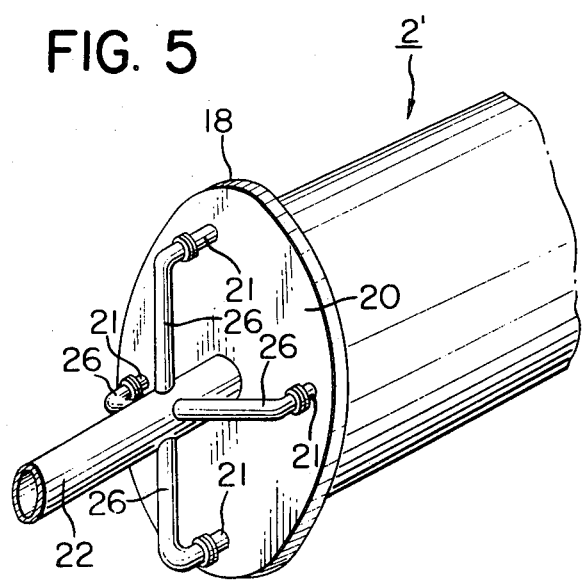

FIG. 2 is a schematic sectional view showing an embodiment of the apparatus for manufacturing a rapidly cooled solidified slag of the present invention. In FIG. 2, 1 is an enclosed-structure housing. The housing 1 has an opening 1a at the top thereof for passing a molten slag, and a discharge port 1b at the lower end thereof for discharging a crushed rapidly cooled solidified slag. A suitable opening and closing means (not shown) is provided in the discharge port 1b. In the housing 1, a pair of cooling drums 2' each having the same diameter and the same length are arranged so that the axial lines thereof are parallel with each other in the same horizontal plane and the peripheral surfaces thereof are in contact with each other. Each of the pair of cooling drums 2' is rotated by a suitable driving means as described later, in directions opposite to each other at the same peripheral speed as shown by the arrows "a" and "a'" in FIG. 2, in the rising direction of the peripheral surface of each of the pair of cooling drums 2' at the contact portion thereof.

In FIG. 2, 4 is a heat exchanger. Cooling water circulates through the cooling drums 2', the pipe 3, the heat exchanger 4 and the pipe 5. A pump 6 for supplying cooling water to the cooling drums 2' is provided in the pipe 5 connecting the exit side of the radiation section of the heat exchanger 4 and the cooling drums 2'. In FIG. 2, one heat exchanger 4 is shown to be connected to one of the cooling drums 2', however another heat exchanger (not shown) is also connected to the other cooling drum 2' in the same way as mentioned above.

A pair of hollow weirs 18 as described later are fixed to the both ends of the peripheral surface of one of the pair of cooling drums 2'. Only one of the pair of weirs 18 is shown in FIG. 2. A slag sump 15 is formed by the peripheral surface of each of the pair of cooling drums 2' and the pair of weirs 18. Above the pair of cooling drums 2', there is arranged an end of a slag runner 16 as a slag feeding means for pouring a molten slag into the slag sump 15. The molten slag 7 discharged from the slag runner 16 is therefore poured, through the opening 1a of the housing 1, into the slag sump 15 where a slag pool is formed. The molten slag 7 poured into the slag sump 15 adheres in a substantially uniform thickness onto the peripheral surface of each of the cooling drums 2' during the rotation thereof, rapidly cooled and solidified into a rapidly cooled solidified slag by means of the peripheral surface of each of the cooling drums 2'.

As shown in FIG. 2, a scraper 17 is provided on as to be in contact with the lower half of the peripheral surface of each of the pair of cooling drums 2'. The scraper 17 is supported on the housing 1 by means of a suitable supporting means (not shown). When the rapidly cooled solidified slag 7' adhering to on the peripheral surface of each of the cooling drums 2' reaches the lower half of each of the cooling drums 2' along with the rotation of the cooling drums 2', the rapidly cooled solidified slag 7' is peeled off therefrom by the scraper 17, and drops, while being crushed, into the lower part of the housing 1.

In FIG. 2, 8 is a turbine driven by a high-pressure steam from the exit side of the heat absorbing section of the heat exchanger 4; 9 is an electric power generator driven by the turbine 8; 10 is a condenser connected to the turbine 8; 11 is a pump for feeding water from the condenser 10 to the entry side of the heat absorbing section of the heat exchanger 4; 12 is a cooling tower of cooling water for the condenser 10; and, 13 is a pump for feeding the cooling water from the cooling tower 12 to the condenser 10.

In FIGS. 3 to 5, 2'a is the inner wall of one of the cooling drums 2', which has a pair of weirs 18; 2'b is an outer wall fixed concentrically relative to the peripheral of the inner wall 2'a; 19 is a space formed between the inner wall 2'a and the outer wall 2'b; 18 are a pair of hollow weirs each of which is fixed to each end of the outer wall 2'b over the entire periphery thereof so as to form a circular flange at right angle to the axis of the cooling drum 2'; 22 are a pair of center axles each of which is horizontally fixed to the axial center portion of each end of the cooling drum 2' through each of a pair of side walls 20 each of which is fixed to each end of the cooling drum 2', each of the center axles 22 having a hollow portion 24, and having an end closed by a closing plate 25; and, 26 are at least two connecting pipes which connect the pair of hollow weirs 18 to each of the pair of center axles 22 through at least two mouth pieces 21.

The above-mentioned space 19 is divided into at least two compartments 23 by at least two partitions 27 provided along the axial line of one of the cooling drums 2'. In each of at least two compartments 23, a zigzag passage 29 for cooling water parallel to the axial line of the cooling drum 2' is formed by providing a plurality of current plates 28 in parallel with the axial line of the cooling drum 2'. Therefore, cooling water flows from the hollow portion 24 of one of the center axles 22, through one of the connecting pipes 26 and one of the mouth pieces 21, into one of the weirs 18, and after passing through the zigzag passage running through the compartments 23, enters into the other weir 18. Cooling water then flows from the other mouth piece 21 and the other connecting pipe 26 into the hollow portion 24 of the other center axle 22. Thus, the peripheral surface of each of the cooling drums 2' and each of the weirs 18 are efficiently cooled by cooling water. In addition, since the weir 18 is always in rotation in a vertical plane, it is hard for a molten slag to adhere to the surface of the weir 18. As a result, a solidified slag is not formed on the slag pool, so that rotation of the pair of cooling drums 2' is never impaired by solidified slag, and the cooling drums 2' rotate always smoothly.

The pair of center axles 22 of each of the pair of cooling drums 2' are rotatably supported at the both ends thereof in the housing 1 by means of a pair of bearings 30. A driven gear 31 is fixed to one of the center axles 22 and engages with a suitable driving means (not shown). Thus, the cooling drum 2' is rotated by the driving means.

The other drum of the pair of the cooling drums 2' has the same structure as the above-mentioned former cooling drum 2' except for the lack of the provision of the pair of weirs 18.

In the heat exchanger 4, the pressurized steam obtained through heat exchange between the cooling water and steam may be used, in place of driving the turbine 8, for the other applications such as heating the work space in a plant.

According to the present invention, as described above, it is possible to manufacture, from a molten slag, a rapidly cooled solidified slag easily and continuously, to very efficiently recover the heat produced when cooling and solidifying a molten slag into a rapidly cooled solidified slag, and furthermore, to eliminate the risk of stoppage of the cooling drums by a solidified slag adhering to the surface of the weir, because the molten slag hardly adheres to the weir surface, thus always allowing smooth rotation of the cooling drums, and providing industrially useful effects.

What is claimed is:

1. In an apparatus for manufacturing a rapidly cooled solidified slag, which comprises:
   a pair of cooling drums housed in a housing, each having a peripheral surface, each cooling drum having the same diameter and the same length, the peripheral surfaces of said cooling drums being in contact with each other, the axial lines of said pair of cooling drums being arranged in parallel with each other in the same horizontal plane;
   a driving means for rotating said pair of cooling drums in directions opposite to each other at the same peripheral speed in the rising direction of the peripheral surface of each of said pair of cooling drums at the contact portion of said pair of cooling drums;
   means defining a pair of weirs arranged at the both ends of said pair of cooling drums, to form a slag sump in cooperation with the upper half of the peripheral surface of each of said pair of cooling drums;
   a slag feeding means arranged above said pair of cooling drums, for pouring a molten slag into said slag sump;
   a scraper provided so as to be in contact with the lower half of the peripheral surface of each of said pair of cooling drums;
   cooling water for cooling said pair of cooling drums, said cooling water being supplied into each of said pair of cooling drums from an end of a hollow center axle located within each of said pair of cooling drums, said cooling water exchanging heat with said molten slag in said slag sump, which slag has adhered to the peripheral surface of each of said pair of cooling drums, along with the rotation of each of said pair of cooling drums, and, said cooling water which has exchanged heat with said molten slag being discharged to the outside of each of said pair of cooling drums from the other end of said center axle of each of said pair of cooling drums for heat recovery;
   whereby said molten slag adhered to the peripheral surfaces of said pair of cooling drums is converted into a rapidly cooled solidified slag through heat exchange with said cooling water and is then peeled off from the peripheral surfaces of said pair of cooling drums by means of said scraper, along with the rotation of said pair of cooling drums;
   the improvement wherein:
   each of said pair of weirs defined by said weir defining means has an annular shape and has a hollow portion therein; and
   said means defining each of said pair of weirs being respectively fixed to each edge of the peripheral surface of one of said pair of cooling drums so as to form a circular flange at right angles to the axial line of said one cooling drum over the entire circumference thereof.

2. The apparatus as claimed in claim 1, wherein:
   each of said pair of cooling drums comprises concentric inner and outer cylindrical walls, said inner and outer cylindrical walls forming a space therebetween, and, said cooling water passing through said hollow portion of each of said pair of weirs and said space in each of said pair of cooling drums, thereby cooling said pair of weirs and said pair of cooling drums.

3. The apparatus as claimed in claim 2, wherein:
   said space of each of said pair of cooling drums is divided into at least two individual compartments by means of at least two partitions which is provided in said space in parallel with the axial line of said cooling drum, thereby said cooling water individually passing through said individual compartments.

4. The apparatus as claimed in claim 3, wherein:
   at least one current plate is provided, in each of said at least two individual compartments, in parallel with the axial line of said cooling drum, thereby said cooling water passing through said individual compartments along a zigzag line substantially in parallel with the axial line of said cooling drum.

5. The apparatus as claimed in any one of claims 1, 2, 3 or 4, wherein each of said pair of weirs is rotatable with said one cooling drum, said weirs rotating in a substantially vertical plane.

6. The apparatus as claimed in claim 1, wherein said hollow portion of each of said pair of weirs extends circumferentially around the complete periphery of said one cooling drum, said cooling water passing through said hollow portions of said weirs to cool said weirs.

* * * * *